(12) United States Patent
Nagashima

(10) Patent No.: US 12,238,144 B2
(45) Date of Patent: Feb. 25, 2025

(54) INFORMATION PROCESSING APPARATUS, METHOD, AND STORAGE MEDIUM

(71) Applicant: CANON KABUSHIKI KAISHA, Tokyo (JP)

(72) Inventor: Takeyuki Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 17/823,891

(22) Filed: Aug. 31, 2022

(65) Prior Publication Data
US 2023/0065225 A1    Mar. 2, 2023

(30) Foreign Application Priority Data
Sep. 2, 2021   (JP) ................................ 2021-142929

(51) Int. Cl.
G06F 1/30        (2006.01)
H04L 9/40        (2022.01)

(52) U.S. Cl.
CPC ............ *H04L 63/205* (2013.01); *G06F 1/305* (2013.01); *H04L 63/20* (2013.01)

(58) Field of Classification Search
CPC ... G06F 1/26; G06F 1/30; G06F 1/305; H04L 63/20; H04L 63/205
See application file for complete search history.

(56) References Cited

U.S. PATENT DOCUMENTS

2017/0013110 A1 *   1/2017   Sato ..................... H04W 12/06

FOREIGN PATENT DOCUMENTS

JP        2013254245 A   * 12/2013
JP        2016153992 A      8/2016

* cited by examiner

*Primary Examiner* — D'Arcy Winston Straub
(74) *Attorney, Agent, or Firm* — Canon U.S.A., Inc., IP Division

(57) ABSTRACT

The present disclosure is directed to providing an information processing apparatus in which a management application is executed sets a first schedule for determining timing for transmitting an instruction to shift to a predetermined power supply state in which a request via a network fails to a management target device and a second schedule for determining timing for transmitting a request according to a setting of a security policy to the management target device via the network, and executes processing so that timing for transmitting a request based on the second schedule regarding the setting of the second schedule does not overlap with a period during which a request fails due to an instruction to be transmitted based on the first schedule.

7 Claims, 11 Drawing Sheets

FIG. 5

| DEVICE LIST | | |
|---|---|---|
| DEVICE NAME | PRODUCT NAME | ADDRESS |
| DevA1 | DevA | ipA1 |
| DevA2 | DevA | ipA2 |
| ⋮ | ⋮ | ⋮ |
| DevAn | DevA | ipAn |

FIG. 7

POWER SUPPLY MANAGEMENT SETTING

TASK :

| TASK TYPE | POWER SUPPLY MANAGEMENT SETTING |
|---|---|
| TASK NAME | DEVICE STOP |

DEVICE :

|   | DEVICE NAME | PRODUCT NAME | ADDRESS |
|---|---|---|---|
| ☑ | DevA1 | DevA | ipA1 |
| ☑ | DevA2 | DevA | ipA2 |
|   | : | : | : |
| ☑ | DevAn | DevA | ipAn |

SCHEDULE :

| OPERATION TYPE | POWER OFF |
|---|---|
| START DATE AND TIME | yyyy/mm/dd |
| EXECUTION TIME SLOT START TIME | 20 : 00 |
| END TIME | 07 : 00 |
| INTERVAL | EVERY ONE HOUR |

( REGISTER )  ( CANCEL )

FIG. 8

SECURITY POLICY SETTING

TASK:

| TASK TYPE | SECURITY POLICY SETTING |
|---|---|
| TASK NAME | APPLICATION OF POLICY A |

DEVICE:

| | DEVICE NAME | PRODUCT NAME | ADDRESS |
|---|---|---|---|
| ☑ | DevA1 | DevA | ipA1 |
| ☑ | DevA2 | DevA | ipA2 |
| | : | : | : |
| ☑ | DevAn | DevA | ipAn |

SCHEDULE:

| APPLICATION POLICY | POLICY A |
|---|---|
| START DATE AND TIME | yyyy/mm/dd |
| EXECUTION TIME SLOT START TIME | 06 : 00 |
| END TIME | 23 : 00 |
| INTERVAL | EVERY ONE HOUR |

( REGISTER )  ( CANCEL )

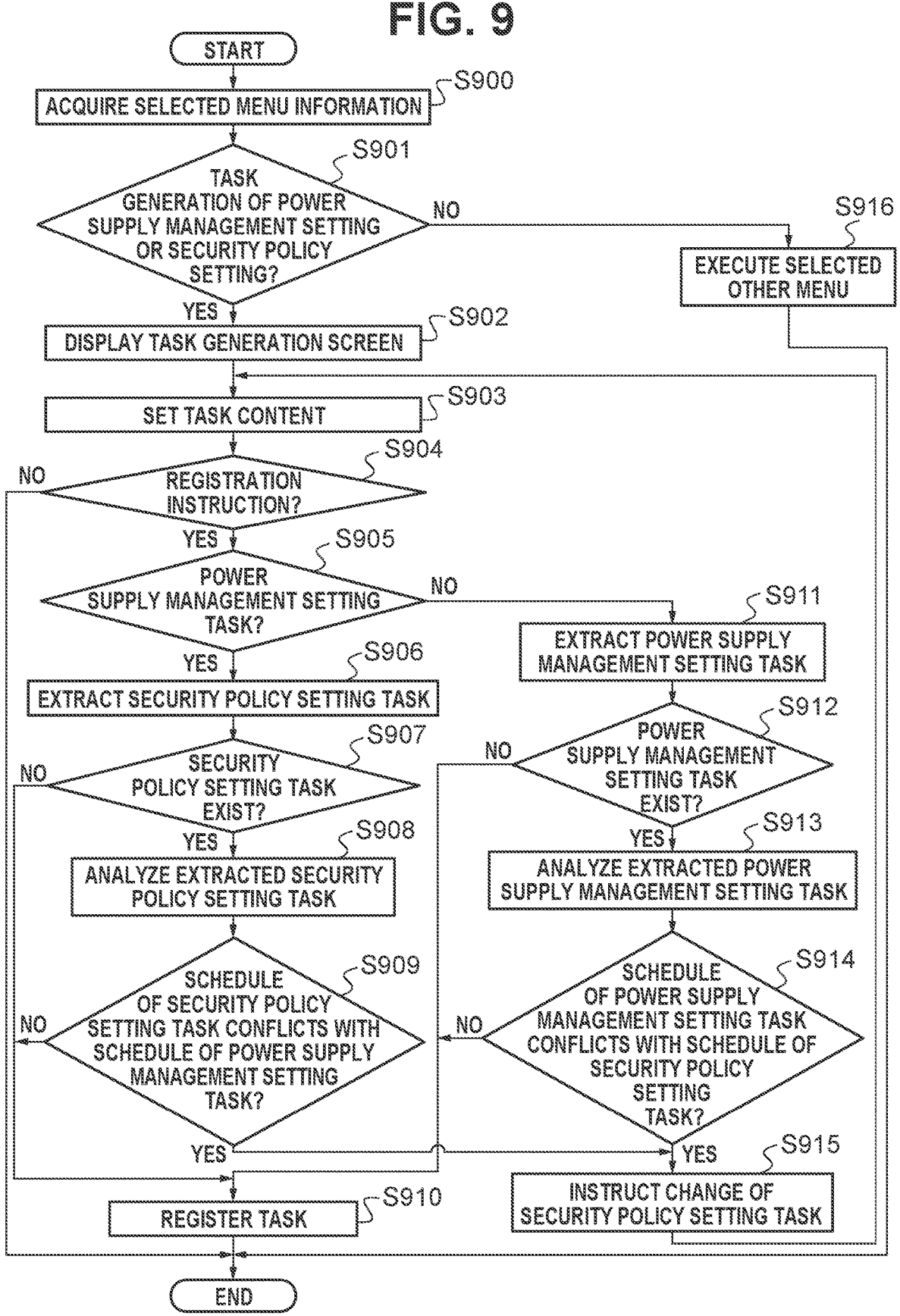

FIG. 10

SECURITY POLICY SETTING

TASK :

| TASK TYPE | SECURITY POLICY SETTING |
|---|---|
| TASK NAME | APPLICATION OF POLICY B |

DEVICE :

|   | DEVICE NAME | PRODUCT NAME | ADDRESS |
|---|---|---|---|
| ☑ | DevA1 | DevA | ipA1 |
| ☑ | DevA2 | DevA | ipA2 |
|   | : | : | : |
| ☑ | DevAn | DevA | ipAn |

SCHEDULE :

| APPLICATION POLICY | POLICY B |
|---|---|
| START DATE AND TIME | yyyy/mm/dd |
| EXECUTION TIME SLOT<br>START TIME<br>END TIME | <br>06 : 00<br>23 : 00 |
| INTERVAL | EVERY ONE HOUR |

☑ EXECUTION PRIORITY HIGH
☑ FORCED STARTUP OF DEVICE ( REGISTER )   ( CANCEL )

FIG. 11

| OPERATION TYPE | PRIORITY TASK |
|---|---|
| POWER OFF | POWER SUPPLY MANAGEMENT SETTING |
| SLEEP | POWER SUPPLY MANAGEMENT SETTING |
| REBOOT | SECURITY POLICY SETTING |
| WAKE UP | SECURITY POLICY SETTING |

SETTING OF TASK EXECUTION PRIORITY

STORE  CANCEL

INFORMATION PROCESSING APPARATUS, METHOD, AND STORAGE MEDIUM

BACKGROUND

Field

The present disclosure relates to a technique for realizing appropriate device management in a case where a device exempt from management exists in a device management system including one or more devices connected to a network.

Description of the Related Art

Recently, there are management applications (programs) that provide management functions to a plurality of devices connected to networks in offices. Specifically, there are device management systems that select devices from lists of devices searched from the networks and execute tasks such as device security monitoring and device power supply management (for example, Japanese Patent Application Laid-Open No. 2016-153992).

There is a case where a management application is used to transmit a request for setting a setting value according to an appropriate security policy in a device installation environment to a management target device via a network as a part of device security monitoring.

In addition, there is a case where a period during which a device is required to be turned off or to save power is set in an operation of an office in which the device is installed. A management application is required to have a function of scheduling such a period by an instruction command via the network.

Some types of requests including a setting request of a setting value according to the security policy from the management application to a management target device via the network will fail in a power supply state such as a power off state or a predetermined power saving state.

Thus, in a case where scheduling of the power supply state such as the power off state or the predetermined power saving state is not taken into consideration for execution timing of the setting request according to the security policy, there can be instances where the management application causes a security hole.

SUMMARY

According to various embodiments of the present disclosure, an information processing apparatus that manages device information of a management target device in a storage unit and executes a management application for managing the management target device via a network includes a first setting unit configured to set a first schedule for determining timing for transmitting an instruction to shift to a predetermined power supply state in which a request via the network fails, to the management target device, a second setting unit configured to set a second schedule for determining timing for transmitting a request according to a setting of a security policy to the management target device via the network, and an execution unit configured to execute processing so that timing for transmitting a request based on the second schedule regarding the setting of the second schedule by the second setting unit does not overlap with a period during which a request fails due to an instruction to be transmitted based on the first schedule.

Further features of the present disclosure will become apparent from the following description of example embodiments with reference to the attached drawings.

BRIEF DESCRIPTION OF THE DRAWINGS

FIG. 5 illustrates an example of device information managed by a management server.

FIG. 7 illustrates an example of a task generation screen for a power supply management setting.

FIG. 8 illustrates an example of a task generation screen for a security policy setting.

FIG. 9 is a flowchart illustrating processing for generating a task.

FIG. 10 illustrates an example of task generation for a security policy setting according to a second example embodiment.

FIG. 11 illustrates an example of a setting for task execution priority corresponding to an operation type of a power supply management setting according to a third example embodiment.

DESCRIPTION OF THE EMBODIMENTS

Figure 1:
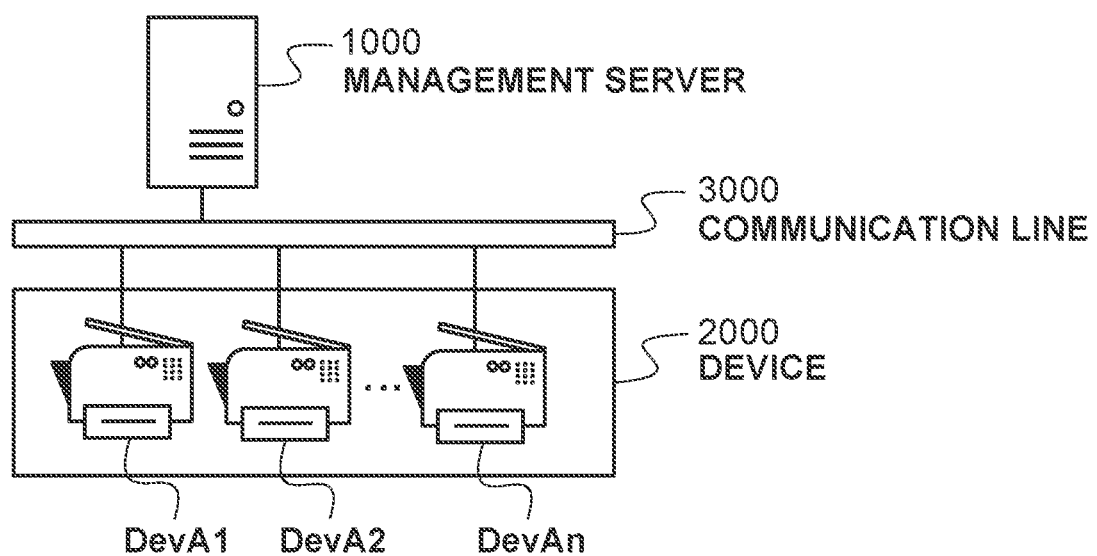
FIG. 1 illustrates an example of a network configuration of a device management system including an information processing apparatus.

FIG. 1 illustrates a configuration example of a device management system including an information processing apparatus that operates as a management server by executing a management application. The device management system includes network devices (hereinbelow, simply referred to as devices) 2000 of DevA1 to DevAn and a management server 1000 that controls management with respect to a management target device. Hereinbelow, the device 2000 of DevA1 is referred to as the device DevA1 (the same applies to the devices 2000 of DevA2 to DevAn). A specific example of the device 2000 is an image forming apparatus that is any of a printer, a copying machine, a digital multifunction peripheral, a three-dimensional (3D) printer, and the like.

The management server 1000 and the device 2000 are connected to a communication line 3000 that is a network such as a local area network (LAN). The network may be a wired line or a wireless network. The communication line 3000 may be an intranet line or an Internet line.

The management server 1000 generates and executes a power supply management setting task and a security setting task with respect to the device 2000 to be a management target and thus realizes device management with respect to the device 2000. In the task, execution timing such as instantaneous execution, designated time execution, and periodic execution can be specified.

Figure 2:
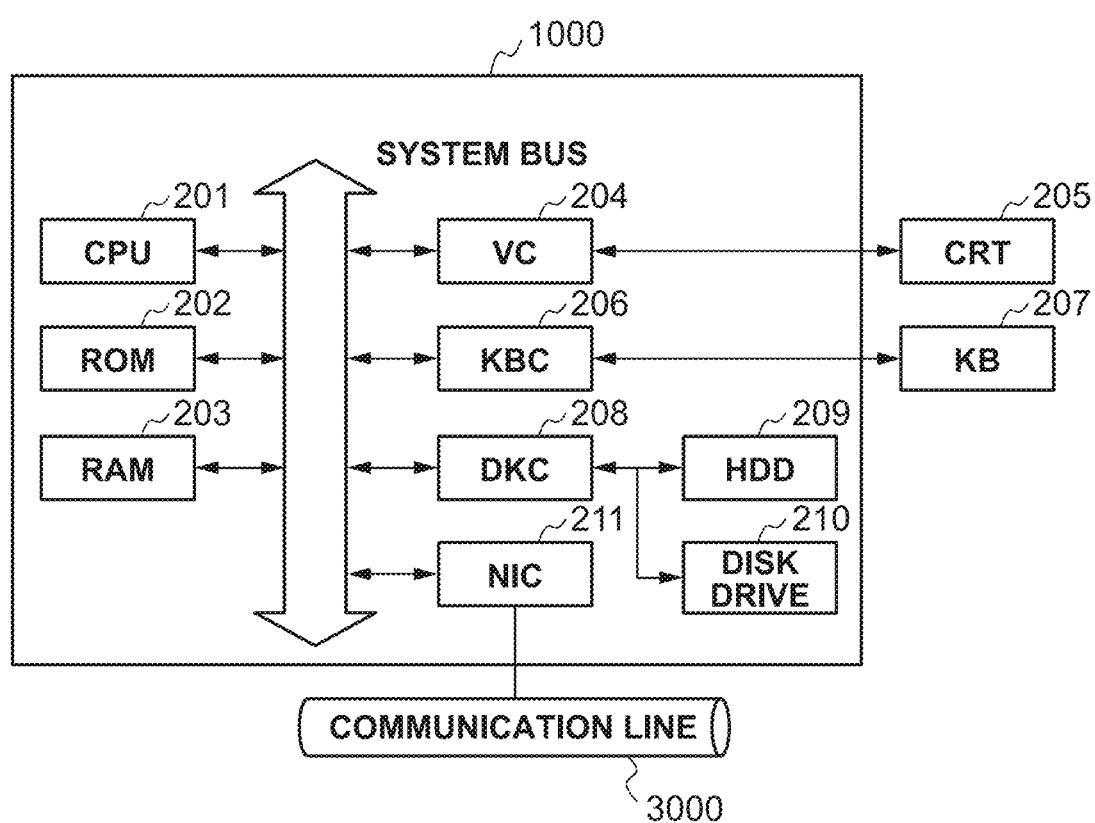
FIG. 2 illustrates a hardware configuration of the information processing apparatus.

FIG. 2 illustrates an example of a hardware configuration of the information processing apparatus as the management server 1000.

According to various embodiments of the present disclosure, a central processing unit (CPU) 201 executes a management application stored in a read-only memory (ROM) 202 and a hard disk drive (HDD) 209 using a random access memory (RAM) 203 as a work area. The information processing apparatus executes the program and thus functions as the management server 1000 that realizes a task generation unit 41, a task management unit 42, a task execution unit 43, and the like. The management application is supplied by a storage medium, for example, a floppy disk (FD), a compact disk-ROM (CD-ROM), a digital versatile disk (DVD), or an integrated circuit (IC) memory card that can be mounted to a disk drive 210.

The CPU 201 accesses the HDD 209 and the disk drive 210 via a disk controller (DKC) 208 and stores the management application and the like in the HDD 209. The CPU 201 displays a user interface on a display device (cathode-ray tube (CRT)) 205 via a video card (VC) 204. Further, the CPU 201 performs control corresponding to an instruction input to the user interface from a keyboard (KB) 207 and a pointing device such as a mouse via a keyboard controller (KBC) 206. The CPU 201 can perform communication processing with the device 2000 on the communication line 3000 via a network interface board (NIC) 211.

Figure 3:
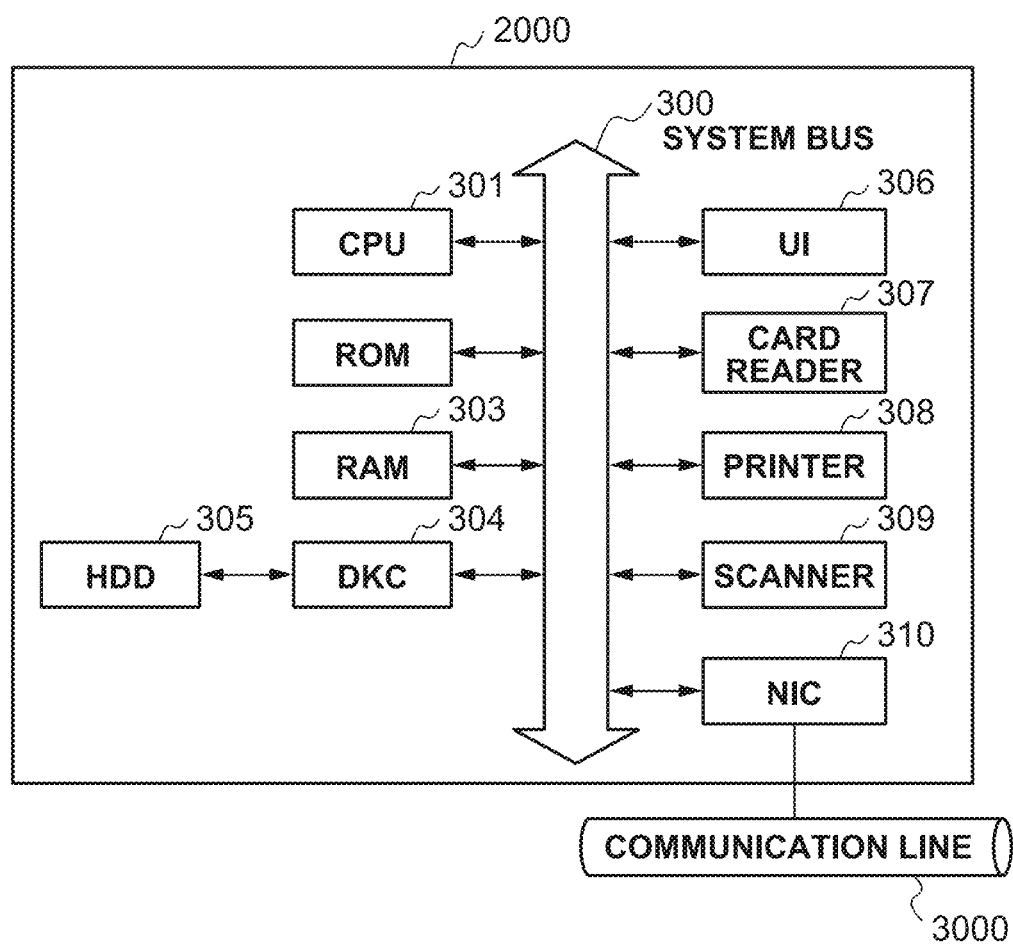
FIG. 3 illustrates an example of a hardware configuration of a network device.

FIG. 3 illustrates an example of a hardware configuration of the device 2000. A configuration of a digital multifunction peripheral is described here as the device 2000. The device 2000 has functions related to printing such as printing and copying and a function of communicating with an external apparatus such as the management server 1000 via the communication line 3000.

A CPU 301 functions as a controller that controls an entire system. The CPU 301 executes a control program to control a printer 308 and a scanner 309, which are connected to a system bus 300. A power supply management unit 45 and a security policy management unit 46 are realized by the control program. Specifically, the CPU 301 executes the control program using a RAM 303 as a work area and controls and executes various functions by the power supply management unit 45 and the security policy management unit 46 via the system bus 300.

The CPU 301 accesses a HDD 305 via a disk controller (DKC) 304. The CPU 301 can perform communication processing with the management server 1000 on the communication line 3000 via a network interface card (NIC) 310. A user interface (UI) 306 includes a switch and a light emitting diode (LED) display device for a user of a print system to perform an operation. The UI 306 transmits information based on the operation performed on the UI 306 by the user of the print system to the CPU 301. The CPU 301 performs log-in processing of the user by checking information of an IC card received from a card reader 307 against user information stored in advance in the HDD 305.

Figure 4:
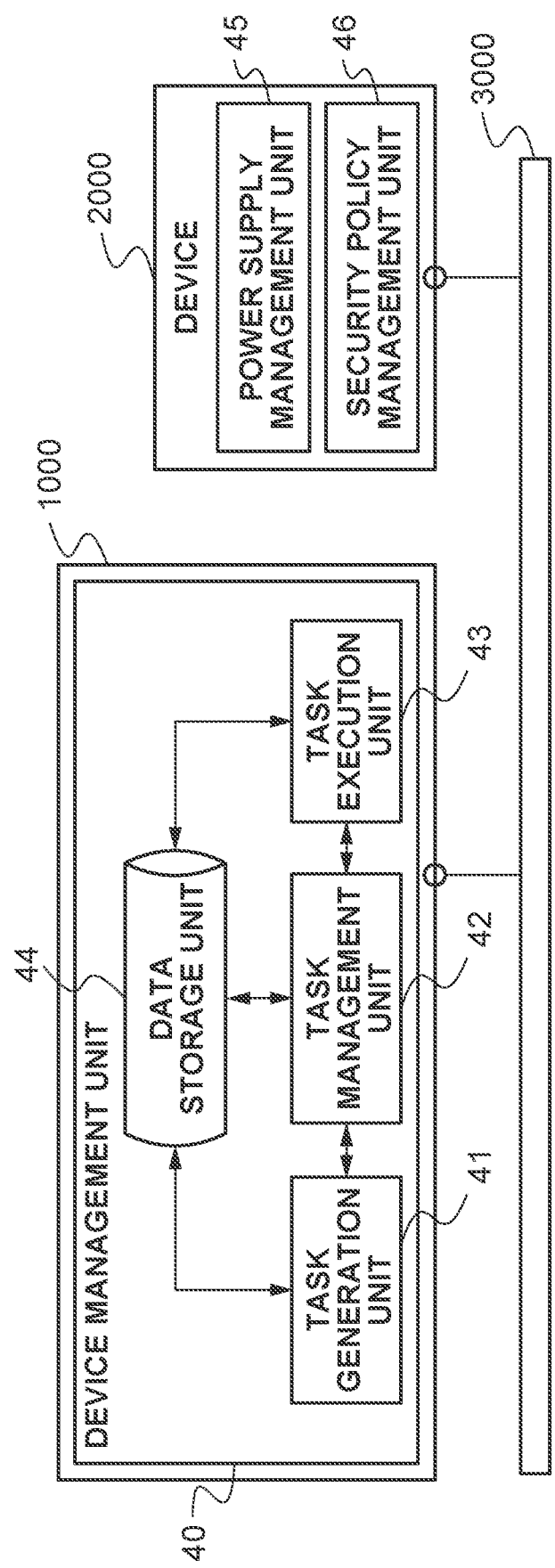
FIG. 4 illustrates an example of a module configuration based on software of the device management system.

FIG. 4 illustrates an example of a module configuration in software of the management server 1000 and the device 2000.

A device management unit 40 included in the management server 1000 is configured with the task generation unit 41, the task management unit 42, and the task execution unit 43. The device management unit 40 realized based on the management application can also be implemented as a web-based application, and in that case, the device management unit 40 can be used via a web browser. A data storage unit 44 in the management server 1000 can use a database operating in an external storage service and the like in addition to the HDD 209.

The task management unit 42 has a function of managing a task generated by the task generation unit 41 and stored in the data storage unit 44. The task management unit 42 instructs the task execution unit 43 to execute the task based on a schedule set in the task.

An example of a task of the task generation unit 41 includes a search task using a function of searching for a device with respect to the network by a Simple Network Management Protocol (SNMP), Internet Protocol (IP) Broadcast, Service Location Protocol (SLP)/Multicast, and the like.

The task execution unit 43 executes a search for the device 2000 accompanied by acquisition of device information such as management information base (MIB) via the communication line 3000 in accordance with an instruction to execute the task from the task management unit 42. According to the present example embodiment, the task execution unit 43 acquires the device information including identification information such as a device name, a product name, and an address as a device search result, and the data storage unit 44 stores the device search result in a storage unit. In the storage unit, operation information including at least any of status information, counter information, or log information is also stored as the device information and used for the device management. These pieces of the operation information are acquired from a management target device.

FIG. 5 illustrates an example of the device information that is managed based on the device search result by the management server 1000 and includes the device name, the product name, and the address. These pieces of the device information are managed by the management application as information about the management target device.

For example, it is indicated that the device DevA1 of which the device name is DevA1 is the device 2000 that has the product name of DevA and the address of ipA1. The same applies to the devices DevA2 to DevAn. The device information may be acquired by importing a file such as a comma separated value (CSV) file in addition to the device search performed by the task execution unit 43.

An example is described in which the task generation unit 41 generates a setting task for power source management to the device 2000 as the management target. According to the setting of the task, a request including an instruction to shift a target device to a power off state or a power saving state or to restore the target device from the power saving state is transmitted from the management server 1000 via the network.

For example, an administrator operates the management server 1000 to generate a task in which a schedule to turn off the power supply of the devices DevA1 to DevAn is set in a time slot from 20:00 to 07:00 on weekdays. In this case, a request including an instruction to power off the target device is transmitted from the management server 1000 via the network at 20:00.

The task generation unit 41 also generates a security policy setting task to the device 2000 as the management target. For example, as a setting related to the security policy, the task generation unit 41 transmits a request for causing the target device to set a setting value for disabling use of a file transfer protocol (FTP) port and a Universal Serial Bus (USB) port provided to the devices DevA1 to DevAn. Further, the task generation unit 41 can generate a task to check whether the setting is maintained in the devices DevA1 to DevAn every one hour. In addition, the task generation unit 41 can generate a task to transmit a request for setting the same setting value by overwriting every one hour so that the setting is maintained in the devices DevA1 to DevAn.

The task management unit 42 instructs the task execution unit 43 to execute the task in response to the schedule indicating transmission timing of the request of each generated task. In a case of executing the power supply management setting task and the like, the task execution unit 43 communicates with a correspondence module such as the power supply management unit 45 of the device 2000 by a web service using a protocol such as a Simple Object Access Protocol (SOAP).

If the management server 1000 transmits a request for acquisition of the operation information or a request for various settings to a device in the power supply state such as the power off state or the predetermined power saving state via the network, the target device cannot execute the corresponding processing, and thus those requests fail.

In another power saving state, which is not the predetermined power saving state, the device may be able to be automatically restored from the power saving state and execute processing related to the request in response to the request via the network.

In a case of executing the security policy setting task, the task execution unit 43 communicates with the security policy management unit 46 of the device 2000 by the web service.

For example, in a case where the target device is powered off, the communication fails, and a request based on the task related to the security policy will fail.

Linkage of execution schedules in a case of executing the power supply management setting task and the security policy setting task with respect to the device 2000 in the device management system is described in detail with reference to FIGS. 5 to 9.

Figure 6:
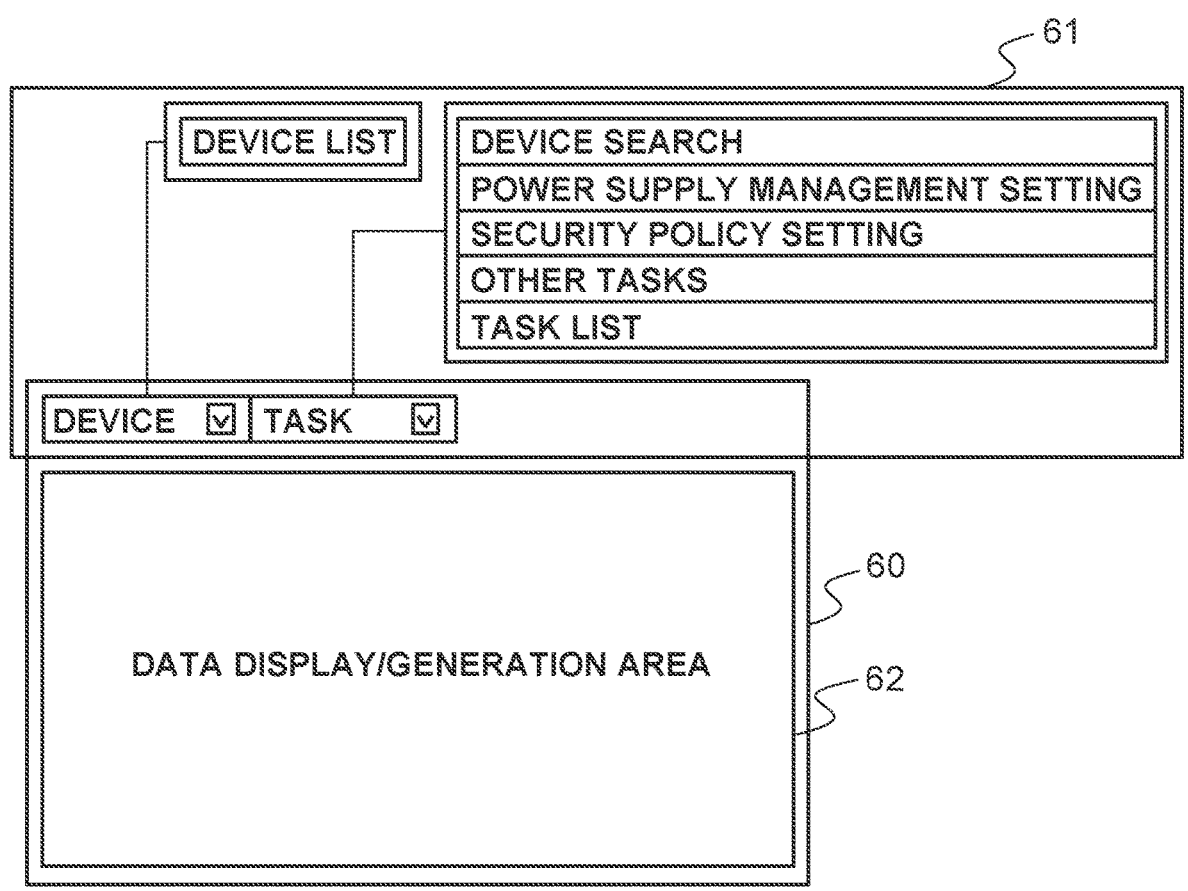
FIG. 6 illustrates an example of a screen provided by the management server.

FIG. 6 illustrates an example of a device management screen 60 provided by the device management unit 40. The device management screen 60 includes a menu 61 and a data display/generation area 62. The device management unit 40 displays a data display/generation screen corresponding to a selected menu 61 in the data display/generation area 62 of the display device 205.

The menu 61 includes a "device" menu including a "device list" submenu for displaying a list of information related to the device 2000 as the management target included in FIG. 5. The menu 61 further includes a "task" menu configured with submenus related to tasks such as "device search", "power supply management setting", "security policy setting", "other tasks", and "task list".

The "other tasks" include, for example, a task to select the device 2000 to be a target of the task execution from the device list illustrated in FIG. 5 and to perform device clone and storage backup generation.

The device clone in the device clone and the storage backup generation is a task to acquire data configured with various setting items included in the device 2000 such as the power saving setting and the security setting of the device 2000 and setting values thereof. Meanwhile, the storage backup generation is a task to back up a storage area including user data registered in the device 2000 such as an address book and user registration information in the device 2000. The data of the device 2000 acquired as the device clone can be set to another device 2000 including the same setting item.

The "task list" represents a function of displaying a list of a task generated by the task generation unit 41 and a task executed by the task execution unit 43. The task generation unit 41 can generate a task by editing the task displayed in the "task list" without generating a new task.

Processing related to generation of a task is described with reference to a flowchart illustrated in FIG. 9. The present processing includes control related to the linkage of the execution schedules of the tasks to execute the requests for the power supply management setting and the security policy setting with respect to the power supply management unit 45 and the security policy management unit 46 of the device 2000. The present processing is realized by the CPU of the information processing apparatus executing the management application (the program).

First, in step S900, the task generation unit 41 acquires menu information corresponding to a user selection with respect to the menu 61 in FIG. 6.

Next, in step S901, the task generation unit 41 determines whether the selected menu information indicates a menu of "power supply management setting" or "security policy setting". In a case where it is determined that the menu information is the "power supply management setting" or the "security policy setting" (YES in step S901), the processing proceeds to step S902. In a case where the menu information indicates a selection of other menus (NO in step S901), the processing proceeds to step S916. In step S916, the task generation unit 41 executes processing related to a task corresponding to the selected menu.

Next, in step S902, the task generation unit 41 displays a task generation screen for generating a "power supply management setting" task or a "security policy setting" task on the display device 205. In step S903, the task generation unit 41 newly generates a task and sets a content input to the task generation screen displayed in step S902 to the task.

FIG. 7 illustrates an example of the task generation screen for the "power supply management setting" provided by the management application. The task generation screen for the "power supply management setting" includes "task", "device", and "schedule" sections.

The "task" section includes a "task type" and a "task name". The "task type" displays a type of the task to be generated in a fixed character string, and the "task name" is an edit box for setting a name of the task to be generated.

The "device" section is a section for selecting a device to be a task execution target from the devices 2000 as the management targets.

The "schedule" section includes an "operation type", "start date and time", an "execution time slot", and an "interval". The "operation type" is a list box including operation items related to the power supply of the device 2000 such as ON/OFF of the power supply of the device 2000, a shift to the power saving state (sleep), wake-up from the power saving state, and reboot.

Next, the "start date and time" is an edit box for setting the date and time to start execution of the generated task. Next, the "execution time slot" is a spin button for specifying a time slot to execute the task. The "execution time slot" may only specify a start time, which simply means a time to execute. A form of specifying a day of the week on which the task is executed or specifying the execution time slot for each day of the week can be applied to the "execution time slot".

Next, the "interval" is an edit box for specifying a time interval to periodically check whether an execution content of the task is maintained in the execution time slot after the task is started.

Further, the "power supply management setting" screen includes a [register] button for registering the set task and a [cancel] button for canceling the processing.

According to the present example embodiment, the task generation unit 41 sets the "task type" to the "power supply management setting", the "task name" to "device stop", and the like according to the input to the task generation screen for the "power supply management setting" illustrated in FIG. 7. The task generation unit 41 selects the devices DevA1 to DevAn as the devices to be the task execution targets. Next, the task generation unit 41 selects "Power Off" as the "operation type" that turns the power supply of the device 2000 off in a certain time slot as the execution schedule of the generated task. The task generation unit 41 sets the "start date and time" to "yyyy/mm/dd" and sets the power supply of the device 2000 to be turned OFF at 20:00 and to be turned ON at 07:00. Further, the task generation unit 41 sets the "interval" to "every one hour" so as to check whether the execution content of the task is maintained at every one hour.

FIG. 8 illustrates an example of the task generation screen for the "security policy setting" provided by the management application. The task generation screen for the "security policy setting" is the same as the task generation screen for the "power supply management setting" in FIG. 7 described above, except for an "application policy" in the "schedule" section.

The "application policy" is information including a setting item and a setting value of the security policy to be applied to the device 2000, which is specified in advance.

The task generation unit 41 sets the "task type" to the "security policy setting" and the "task name" to "application of policy A" on the task generation screen for the "security policy setting" illustrated in FIG. 8. The task generation unit 41 selects the devices DevA1 to DevAn as the devices 2000 to be the task execution targets.

Next, the task generation unit 41 selects the "policy A" from the "application policy" as the security policy to be applied to the device 2000 as the execution schedule of the generated task.

The "policy A" represents the security policy that is specified in advance and is selected from the "application policy" in the "schedule" section.

According to the present example embodiment, the "policy A" is the security policy specifying that a "USB port availability" is "unavailable", another port is "available", and a "password" for logging in to the device 2000 includes "at least eight letters", which are the setting items of the device 2000.

The task generation unit 41 sets the "start date and time" to "yyyy/mm/dd" and the time slot for checking the security policy of the device 2000 to 06:00 to 23:00.

Further, the task generation unit 41 sets the "interval" to "every one hour" to check whether the execution content of the task is maintained every one hour.

The task execution unit 43 can also execute processing for transmitting a request for setting the setting value of the setting item corresponding to the policy A to the target device at the "start date and time". Further, the task generation unit 41 can separately generate a task for transmitting a request for setting the setting value of the setting item corresponding to the policy A other than monitoring by specifying an execution target and a schedule.

Next, in step S904, the task generation unit 41 detects a button action such as pressing of the [register] button and determines whether it is a registration instruction. In a case of the registration instruction by pressing the [register] button (YES in step S904), the processing proceeds to step S905. In a case where pressing of the [cancel] button is detected (NO in step S904), the task generation unit 41 cancels the settings up to this step and terminates the present processing.

Next, in step S905, the task generation unit 41 determines whether the task to be registered is the "power supply management setting" task, and in a case of the "power supply management setting" task (YES in step S905), the processing proceeds to step S906. In a case of the "security policy setting" (NO in step S905), the processing proceeds to step S911.

In step S906, the task generation unit 41 checks and extracts information of the stored "security policy setting" task via the data storage unit 44. In step S907, the task generation unit 41 determines whether the "security policy setting" task exists in step S906. In a case where the "security policy setting" task exists (YES in step S907), the processing proceeds to step S908, and otherwise (NO in step S907), the processing proceeds to step S910. In the case where the processing proceeds to step S910, the task generation unit 41 registers and stores the "power supply management setting" task in the storage unit via the data storage unit 44 with the task contents set in step S903 and terminates the processing.

In step S911, the task generation unit 41 checks and extracts information of the stored "power supply management setting" task via the data storage unit 44. In step S912, the task generation unit 41 determines whether the "power supply management setting" task exists in step S911. In a case where the "power supply management setting" task exists (YES in step S912), the processing proceeds to step S913, and otherwise (NO in step S912), the processing proceeds to step S910. In the case where the processing proceeds to step S910, the task generation unit 41 registers and stores the "security policy setting" task in the storage unit via the data storage unit 44 with the task contents set in step S903 and terminates the processing.

In step S913, the task generation unit 41 analyzes the "power supply management setting" task extracted in step S911. Here, it is assumed that, for example, the setting contents of the "power supply management setting" task illustrated in FIG. 7 are stored as analysis contents.

In step S914, the task generation unit 41 determines whether the execution schedule of the "power supply management setting" task analyzed in step S913 conflicts with the execution schedule of the "security policy setting" task in FIG. 8. Depending on the execution schedule of the "power supply management setting" task, a period occurs during which the target device is in the power supply state in which the target device cannot process or respond to a request for setting and monitoring the security policy to be transmitted via the network. In a case where at least part of the both schedules overlap with each other, such as timing of a request according to the execution schedule of the "security policy setting" task occurs during this period, it is determined that there is a conflict in step S914. In a case where it is determined that there is no conflict (NO in step S914), the processing proceeds to step S910.

According to the present example embodiment, the task generation unit 41 analyzes that the "start date and time" is "yyyy/mm/dd", and the "execution time slot" is "20:00 to 07:00" in the execution schedule of the "power supply management setting" task in FIG. 7. Further, since the "start date and time" is "yyyy/mm/dd", and the "execution time slot" is "06:00 to 23:00" in the execution schedule of the "security policy setting" in FIG. 8, the task generation unit 41 determines that the execution schedules conflict with each other (YES in step S914).

Next, in step S915, the task generation unit 41 issues an instruction to change the setting content of the "security policy setting", and then, the processing proceeds to step S903. According to the present example embodiment, the task generation unit 41 automatically determines the setting content of the execution schedule of the "security policy setting" to which the setting content not overlapping with the "power supply management setting" task in which the "start date and time" is "yyyy/mm/dd", and the "execution time slot" is "20:00 to 07:00" is reflected, and issues the instruction of the setting content. After the processing in step S903, the subsequent processing is executed again based on the changed setting content.

After the processing in step S915, the processing can proceed to step S902, and the task generation screen to which the changed content is applied can be displayed. In this case, it is necessary for a user who confirms the changed content to press the [register] button again.

Next, the processing in step S908 is described. In step S908, the task generation unit 41 analyzes the "security policy setting" task extracted in the above-described step S906. In step S909, the task generation unit 41 determines whether the execution schedule of the "security policy setting" task analyzed in step S908 conflicts with the execution schedule of the "power supply management setting" task in FIG. 7. In the case where there is a conflict (YES in step S909), the processing proceeds to the above-described step S915. Whereas in a case where it is determined that there is no conflict (NO in step S909), the processing proceeds to step S910.

If it is assumed that the "security policy setting" task in FIG. 8 is generated and stored before the "power supply management setting" task in FIG. 7, it is determined that the execution schedules conflict with each other (YES in step S909).

A conflict check of the execution schedules of the "power supply management setting" task and the "security policy setting" task may be realized not after pressing of the registration button on the task generation screen in steps S909 or S914 but during the setting processing in steps S902 and S903.

In this case, in a case where it is determined that there is the conflict at the time of generating the "power supply management setting" task, the task generation unit 41 additionally provides information of the execution schedule of the "security policy setting" task. The information can be provided by being displayed as a notification on the task generation screen or by being separately displayed using a dialog or the like.

In a case where it is determined that there is the conflict at the time of generating the "security policy setting" task, the task generation unit 41 additionally provides information of the execution schedule of the existing "power supply management setting" task. The information can be provided by being displayed as a notification on the task generation screen or by being separately displayed using a dialog or the like.

Accordingly, the task generation unit 41 can receive the setting content that does not conflict with another schedule for the execution schedule of the "security policy setting".

The above-described processing has an effect that execution timing of a request according to the security policy can be appropriately set in consideration of scheduling of the power supply state such as the power off state or the predetermined power saving state.

Next, a second example embodiment of the present disclosure is described. There is a case that a setting value related to complexity of a password for logging in to the device 2000 is changed in response to a change in the security policy in a "security policy setting" task. Alternatively, there is a case that a vulnerability in a port is discovered, and a setting value is changed to disable the port. It may be desirable to prioritize the setting change associated with the change in the security policy as described above over an execution schedule of a power supply management setting.

A mechanism that can also give priority to a "security policy setting" task is described in detail below with respect to a difference from the first example embodiment.

FIG. 10 illustrates a task generation screen in which a check box for specifying "execution priority HIGH" and a check box for specifying "forced startup of device" are added to the task generation screen of the "security policy setting" in FIG. 8. The task generation unit 41 selects a "policy B" as the "application policy" and sets the "task name" to "application of policy B".

A setting of the "policy B" is changed to the one that requires more complexity for a password for logging in to the device 2000 as compared with the previous setting. Specifically, in the changed setting, a password is required to "include three types of uppercase alphabetic characters, lowercase alphabetic characters, numbers, and symbols, and ten or more characters". In a case where this task is executed, the setting is reflected to and monitored on the device 2000.

Next, in a case where the "execution priority HIGH" is ON, if there is a "power supply management setting" task having a conflict of the execution schedule, the task generation unit 41 issues an instruction to change the setting content (schedule) of the "power supply management setting" task instead of the above-described processing in step S914 in FIG. 9. For example, the schedule of the "power supply management setting" task is automatically changed to a time slot excluding a time slot overlapping with the execution schedule of the "security policy setting" task. Alternatively, the task generation unit 41 notifies a user on a screen that it is necessary to change the setting content (schedule) of the "power supply management setting" task and prompts the user to change the setting.

In a case where the task generation unit 41 determines that the "forced startup of device" is ON, the task execution unit 43 turns the power supply of the device 2000 ON if it is OFF at the time of executing the "security policy setting" task. Further, the task execution unit 43 returns the power supply of the device 2000 to OFF after executing the "security policy setting" task. Similarly, the task execution unit 43 wakes the power supply of the device 2000 up if it is in a sleep state at the time of executing the "security policy setting" task and returns the power supply of the device 2000 to the sleep state after executing the "security policy setting" task.

Next, a third example embodiment of the present disclosure is described. The "operation type" of the "power supply management setting" includes various "operation types" such as "Power Off" for turning OFF the power supply of the device 2000, "Sleep" for shifting to the sleep state, "Reboot" for rebooting, and "Wake Up" for returning from the sleep state. For example, in a case where the power saving of the device 2000 is given the highest priority, it is desirable not to execute the "security policy setting" at the time of the "Power Off" or the "Sleep". On the other hand, in a case where the device 2000 is started up after executing the "Reboot" and the "Wake Up" of the device 2000, it is desirable to execute the "security policy setting" task after the device 2000 is started up. In other words, it is desirable that an administrator can set in advance which task execution of the "power supply management setting" or the "security policy setting" is prioritized depending on the "operation type" of the "power supply management setting" task.

Hereinbelow, a suitable and detailed description of an example embodiment of the present disclosure that realizes the above-described technique is given.

FIG. 11 illustrates a "setting of task execution priority" screen for setting which task execution of the "power supply management setting" or the "security policy setting" is prioritized.

The "setting of task execution priority" screen includes settings of the "operation type" and a "priority task". Further, the "setting of task execution priority" screen includes a [store] button for storing a set content in the data storage unit 44 and a [cancel] button for cancelling the processing.

The "operation type" is linked to the "operation type" in FIG. 7.

The "priority task" is a list box for setting which task execution of the "power supply management setting" and the "security policy setting" is prioritized with respect to each "operation type".

The "setting of task execution priority" may be a setting function that is selected as the menu 61 in FIG. 6 and be common to the "power supply management setting" task or may be able to set in task generation in the "power supply management setting" in FIG. 7. The "operation type" is not limited to the "Power Off", the "Sleep", the "Reboot", and the "Wake Up".

Further, the "priority task" is not limited to the "power supply management setting" and the "security policy setting".

For example, in a case where the "operation type" is the "Reboot", it is possible to provide an option of whether to execute the "security policy setting" task before or after rebooting the device 2000. According to the present example embodiment, the task generation unit 41 prioritizes the task execution of the "power supply management setting" in the case where the "operation type" is the "Power Off" and the "Sleep" and prioritizes the task execution of the "security policy setting" in the case of the "Reboot" and the "Wake Up".

The task generation unit 41 stores the set content in the data storage unit 44 if the [store] button is pressed.

Next, the task generation unit 41 acquires "setting of task execution priority" information from the data storage unit 44 at the time of analyzing the task extracted in step S908 or S913 in the task generation of the "power supply management setting" or the "security policy setting". In a case where there are the "power supply management setting" task and the "security policy setting" task that conflict with each other, the task generation unit 41 issues an instruction to register the task and change the setting content of the task based on the "setting of task execution priority" information.

For example, in a case where there is the "security policy setting" task of which the execution schedule conflicts at the time of generating the "power supply management setting" task, the task generation unit 41 acquires the setting of the "operation type" of the "power supply management setting" task.

If the "operation type" is the "Power Off", the task execution of the "power supply management setting" is prioritized as illustrated in FIG. 11, and thus the task generation unit 41 registers the generated "power supply management setting" task. Further, the task generation unit 41 issues an instruction to stop execution or to change the setting content of the conflicting "security policy setting" task.

Other Embodiments

Various embodiments of the present disclosure also includes an apparatus or a system that is configured by appropriately combining the above-described example embodiments and methods thereof.

In Various embodiments of the present disclosure, an apparatus or a system serves as a subject that executes one or more software (programs) for realizing the functions of the above-described example embodiments. In various embodiments of the present disclosure, a method for realizing the above-described example embodiments to be executed by the apparatus or the system is also provided. In various embodiments, the program is supplied to the apparatus or the system via a network or various storage media, and is read and executed by one or more memories by one or more computers (a CPU, a micro processing unit (MPU), or the like) of the system or the apparatus. In other words, in various embodiments, the program itself or various computer-readable storage media storing the program is provided. Further, various embodiments of the present disclosure can also be realized by a circuit (for example, an application specific integrated circuit (ASIC)) for realizing the functions of the above-described example embodiments.

Various embodiments of the present disclosure have an effect that execution timing of a setting request according to a security policy can be appropriately set in consideration of scheduling of a power supply state such as a power off state or a predetermined power saving state.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-142929, filed Sep. 2, 2021, which is hereby incorporated by reference herein in its entirety.

What is claimed is:

1. An information processing apparatus that manages device information of a management target device in a storage and executes a management application for managing the management target device, the information processing apparatus comprising:
   one or more memories storing instructions, and
   one or more processors capable of executing the instructions causing the information processing apparatus to:
   set a first schedule for determining timing for transmitting an instruction to shift to a predetermined power supply state in which a request via a network fails, to the management target device;
   set a second schedule for determining timing for transmitting a request according to a setting of a security policy to the management target device via the network; and
   execute processing so that timing for transmitting a request based on the second schedule regarding the setting of the second schedule does not overlap with a period during which a request fails due to an instruction to be transmitted based on the first schedule.

2. The information processing apparatus according to claim 1, wherein a change content of the timing of the second schedule is determined so that the request according to the setting of the security policy is not transmitted during the period during which the request fails due to the instruction to be transmitted based on the first schedule.

3. The information processing apparatus according to claim 2, wherein a screen for setting the change content of the timing of the second schedule is displayed.

4. The information processing apparatus according to claim 1, wherein the device information includes identification information of the management target device.

5. The information processing apparatus according to claim 1, wherein the device information includes at least any of status information, counter information, or log information.

6. A method for an information processing apparatus, the method comprising:
  managing device information of a management target device in a storage unit;
  setting, in a first setting, a first schedule for determining timing for transmitting an instruction to shift to a predetermined power supply state in which a request via a network fails to the management target device;
  setting, in a second setting, a second schedule for determining timing for transmitting a request according to a setting of a security policy to the management target device via the network; and
  executing processing so that timing for transmitting a request based on the second schedule regarding the setting of the second schedule does not overlap with a period during which a request fails due to an instruction to be transmitted based on the first schedule.

7. A non-transitory computer readable storage medium on which is stored a computer program for making a computer execute a method for an information processing apparatus, the method comprising:
  managing device information of a management target device in a storage unit;
  setting, in a first setting, a first schedule for determining timing for transmitting an instruction to shift to a predetermined power supply state in which a request via the network fails to the management target device;
  setting, in a second setting, a second schedule for determining timing for transmitting a request according to a setting of a security policy to the management target device via the network; and
  executing processing so that timing for transmitting a request based on the second schedule regarding the setting of the second schedule does not overlap with a period during which a request fails due to an instruction to be transmitted based on the first schedule.

* * * * *